Dec. 5, 1939.  W. SCHAELCHLIN  2,182,644
SHIP PROPULSION
Filed Nov. 6, 1937
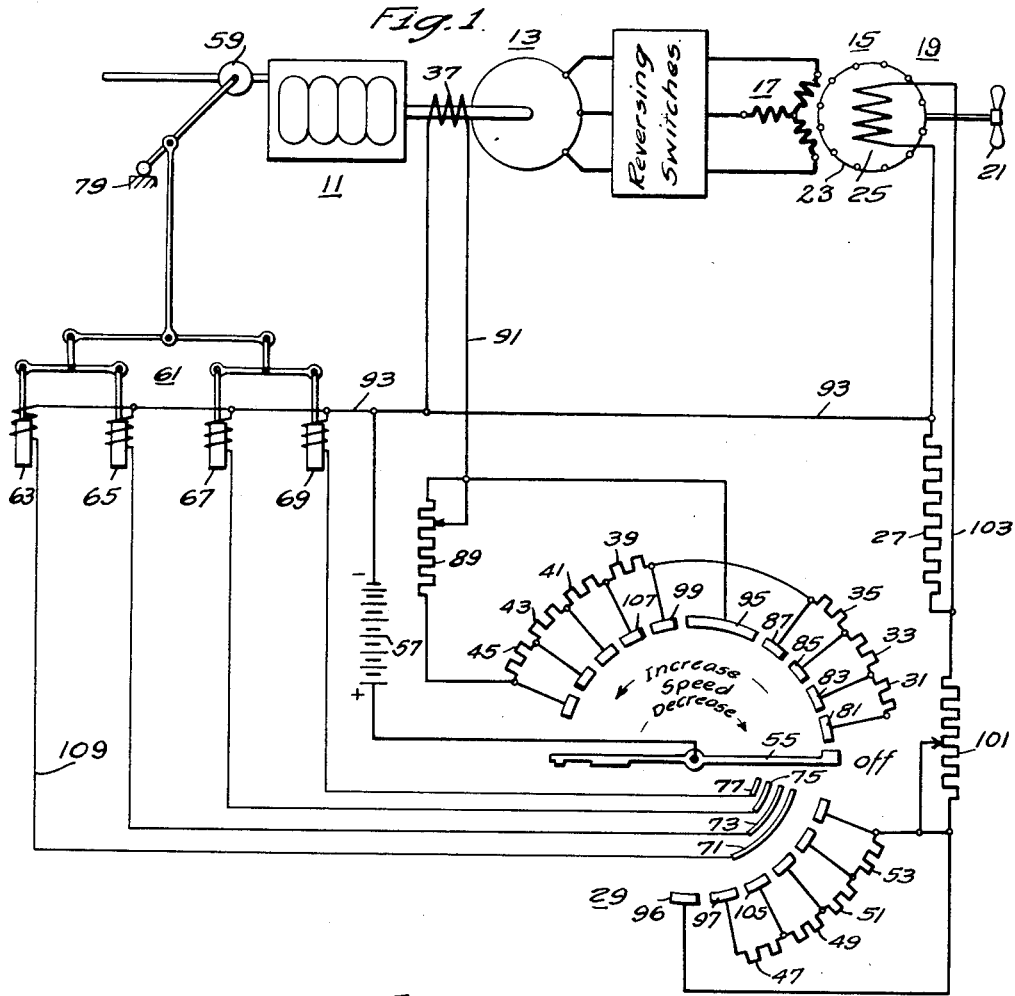
WITNESSES:
E. A. McCloskey
Leon J. Taga
INVENTOR
Walter Schaelchlin.
BY
Paul E. Friedemann
ATTORNEY Patented Dec. 5, 1939

2,182,644

UNITED STATES PATENT OFFICE 2,182,644

SHIP PROPULSION

Walter Schaelchlin, Wilkinsburg, Pa., assignor to Westinghouse Electric & Manufacturing Company, East Pittsburgh, Pa., a corporation of Pennsylvania Application November 6, 1937, Serial No. 173,189

10 Claims. (Cl. 290—17)

My invention relates to the control of electric motors, and more particularly my invention relates to speed control of motors utilized in ship propulsion systems.

In a power system for a ship, where the speed of the propeller-driving motor is changed by varying the alternating current frequency, a variable speed prime-mover drives the generator. In such a system, the speed of the propeller varies as the speed of the prime-mover. A disadvantage of this system is that the speed range is limited by the efficiency and stability of the prime-mover. For example, the lower limit of the speed range for an internal combustion engine is approximately 30% of full speed. It is often desirable to reduce the propeller speed to 10 or 15% of full speed.

It is, accordingly, an object of my invention to control the speed of a driving motor below the stable speed of the prime-mover operating the generator supplying energy to the motor.

Another object of my invention is to control the starting and the operation of a driving motor in the proper sequence and to effect satisfactory acceleration to any selected speed.

A further object of my invention is to control the speed of a conventional synchronous motor during induction motor operation.

More specifically stated, it is an object of my invention to provide for varying the speed of a ship by varying the applied terminal voltage of the propeller driving motor when connected to operate as an induction motor.

In general, it is an object of the invention to provide an improved system of speed control that may be readily practiced and speed control apparatus that is not only efficient and reliable but also inexpensive to manufacture, install and operate.

According to a preferred embodiment of my invention, I provide apparatus for varying the excitation of a synchronous generator. The generator voltage is thus changed. The speed of a motor connected as an induction motor may be varied by applying this variable voltage to its terminals. This may be explained from an equation showing that the torque of an induction motor may be expressed by the relation (1) $\quad T = A\Phi I \cos \theta$ where
A is a constant which depends upon the construction of the motor,
$\Phi$ is the resultant flux of the magnetic circuit,
I is the rotor current,
$\theta$ is the angle of lag in the secondary circuit.

Assuming that the rotor impedance remains substantially constant at reduced frequencies then (2) $\quad I \cos \theta = aES$ where I and $\theta$ have the values hereinabove given and where
$a$ is a constant which depends upon the motor characteristic;
E is the standstill secondary voltage and
S is the ratio of the motor rotor speed to the synchronous speed, which ratio may be expressed in terms of the motor speed as (3) $\quad S = \dfrac{N_s - N}{N_s}$ where
$N_s$ is the synchronous speed,
N is the speed of the motor rotor.

The motor torque may be represented, substantially by the relation (4) $\quad T = A\Phi a E S = b\Phi E^s$ where
$$b = Aa$$

E is a direct function of $\Phi$ and it is substantially proportional to the terminal voltage $E_T$, or (5) $\quad E = C\Phi \text{ and } E = cE_T$ where
C and c are constants (6) $\quad \Phi = hE = hcE_T$ where
$$h = \frac{1}{C}$$

Substituting in Equation 4

(7) $\quad T = bhcE_T cE_T S = bc^2 hE^2_T S$ or (8) $\quad T = kE^2_T S$ where
$$k = bc^2 h$$

(9) Then the slip $S = K\dfrac{T}{E^2_T}$ where
$$K = \frac{1}{k}$$

For ship propulsion loads and other loads where the load torque varies directly as a function of the speed, the engine torque T will reach a definite value. This may be explained by representing the load torque as $$T_L = k'N^2 \text{ (approx.)}$$

where N is the motor speed. Assuming that the system is started from rest and that a terminal voltage $E_T$ is applied to the motor, the motor torque T will increase as the slip S increases, which means that the motor torque increases as the speed decreases. But the load torque $T_L$ increases as the speed N increases. Therefore, for a fixed value of terminal voltage $E_T$, the system will reach stable operation at a definite speed N. If a higher value of terminal voltage $E_T$ is applied, the system will reach stable operation at a higher speed, and similarly if a lower value of terminal voltage $E_T$ is applied, the system will reach stable operation at a lower speed.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which:

Figure 1 is a diagrammatic view of a ship propulsion system including the present invention; and, Fig. 2 is a series of curves which are referred to in explaining my invention.

Referring more particularly to Fig. 1 of the drawing, reference character 11 schematically designates a variable speed prime mover, shown as an internal combustion engine, mechanically connected to drive a synchronous generator or alternator 13 which generates alternating current having a frequency determined by the speed of the prime mover 11 and a voltage influenced by the speed of the prime mover. A synchronous motor 15 having a stator 17 and a rotor 19 is arranged to drive a propeller 21. The rotor 19 is provided with an induction motor winding 23 to be used in the conventional manner and also for variable speed induction motor operation at reduced speeds. It will be understood that the induction motor winding 23 may be the usual damper winding or any other suitable squirrel cage winding. The rotor 19 is also provided with a field winding 25 for synchronous motor operation at the higher speeds. The field winding 25 when in the open-circuited condition is protected from high induced voltages by a field discharge resistor 27.

A controller 29 specifically shown to be of the face-plate type is used to control the operation of the ship propulsion system in a predetermined sequence. A drum type controller or a plurality of electromagnetic switches controlled by a drum controller may be used in place of the face-plate controller. A plurality of resistor sections 31, 33 and 35 are utilized to control the current to a field winding 37 of the generator 13 and thus control the speed of the motor 15 when it is operated as an induction motor. Resistor sections 39, 41, 43 and 45 in the field circuit of generator 13 and resistor sections 47, 49, 51 and 53 in the field circuit of motor 15 are utilized to maintain the stability of the electric system during synchronous motor operation. To select the desired engine speed and power input, a rotatable arm 55 of the controller 29 may be operated to connect any desired portion of the field or control circuits to the battery 57.

The proper interconnection of the generator 13 and the primary winding 17 of the motor 15 is accomplished by means of a set of switches designated as reversing switches. These switches constitute no part of my invention in this application and, therefore, need not be explained in detail. It is only necessary to assume that the reversing switches are properly closed before the generator field 37 is energized.

To control the speed during synchronous motor operation, the fuel intake to the internal combustion engine 11, which engine may be of the Diesel type, is controlled by means of a throttle valve 59 disposed to be operated by a throttle-operating mechanism 61 which includes a system of levers operated by a plurality of electromagnets 63, 65, 67 and 69. The electromagnets 63, 65, 67 and 69 may be successively energized when the arm 55 of controller 29 successively engages contact segments 71, 73, 75 and 77, respectively.

A better understanding of my invention may be had from a study of a typical sequence of operation of the system. The means for starting and the auxiliary means for controlling the internal combustion engine 11 have been omitted because they are not part of the invention. Assume that the internal combustion engine 11 is in operation, and as shown in Fig. 1, it is running at its minimum operating speed which may be substantially 30% of full speed. The throttle-valve 59 and the throttle-operating mechanism 61 are so designed and arranged that they have no control of the speed of the internal combustion below the minimum operating speed. For simplicity, a stop 79 is shown to limit the travel of the throttle-operating mechanism 61 in one direction and thus maintain a predetermined minimum operating speed.

To start and to operate the motor 15 as an induction motor, the arm 55 of the controller 29 may be moved to one of a plurality of stationary contact segments 81, 83, 85 and 87, depending upon the speed of operation to be selected. If the arm 55 of the controller 29 is moved from the "off" position, shown in Fig. 1, and is rotated in a counter-clockwise direction until it makes contact with the contact segment 81, the field 37 of generator 13 thus becomes energized by current of a minimum predetermined value and the generator 13 supplies a predetermined minimum terminal voltage at a predetermined minimum frequency to the primary winding 17 of the motor 15. The generator field circuit may be traced from the positively energized arm 55 of the controller 29 through contact segment 81, resistor sections 31, 33, 35, 39, 41, 43 and 45, adjustable resistor 89, conductor 91, field winding 37 and to the negatively energized conductor 93.

The motor 15 is now operating at its minimum speed. To increase the speed of the motor, the arm 55 is moved farther in the counter-clockwise direction to increase the current in the generator field 37 and thus increase the terminal voltage of the motor 15 as hereinbefore explained. For example, the arm 55 may be moved from contact segment 81 over contact segments 83 and 85 to contact segment 87, thus successively eliminating the resistor sections 31, 33 and 35 from the generator field circuit and increasing the current in the generator field winding 37. The field circuit of the generator 13 which results in the maximum speed of the motor 15 during induction motor operation may be traced from the positively energized arm 55 of the controller 29 through contact segment 87, resistor sections 39, 41, 43 and 45, adjustable resistor 89, conductor 91, field winding 37 of generator 13 and to the negatively energized conductor 93.

During the operation of motor 15 as an induction motor, the speed of the engine 11 remains practically unchanged, therefore, the frequency of the motor terminal voltage remains constant. As the motor speed increases, when the arm 55 of the controller 29 is in the last mentioned position, it approaches a value substantially near synchronous speed. Any further increase in speed must be obtained by operating the motor as a synchronous motor as will be explained hereinafter.

To synchronize the synchronous motor 15 it is started as an induction motor and is accelerated until its speed reaches approximately synchronous speed. This operation may be performed as hereinabove explained, or, if the motor is at rest, the arm 55 of the controller 29 may be moved directly, from the position shown in Fig. 1, over the contact segments 81, 83 and 85 to contact segment 87. When the motor speed becomes constant the arm of the controller 55 is advanced in the counter-clockwise direction until it makes contact with contact segment 95, thus overexciting the field 37 of the generator 13 by temporarily eliminating resistor sections 39, 41, 45 and 47 and the adjustable resistor 89 from the field circuit. After the generator field is thus over-excited, the arm 55 may be advanced further in the counter-clockwise direction until it engages both contact segments 95 and 96, thus fully energizing the field 25 of the motor 15 and effecting synchronization. As soon as the motor 15 pulls into step the arm 55 is advanced still farther in the counter-clockwise direction until it leaves contact segments 95 and 96 and engages contact segments 97 and 99. The resistor sections 39, 41, 43 and 45 and adjustable resistor 89 are thus reinserted in the circuit of the generator field 37 to return the generator excitation back to a normal value. The generator field circuit may now be traced from the positively energized arm 55 of the controller 29 through contact segment 99, resistor sections 39, 41, 43 and 45, adjustable resistor 89, conductor 91, and field winding 37, to the negatively energized conductor 93. The motor field circuit may now be traced from the positively energized arm 55 through the contact segment 97, resistor sections 47, 49, 51 and 53, adjustable resistor 101, conductor 103, and field winding 25 to the negatively energized conductor 93.

The electrical system is still operating at its minimum frequency and the motor 15 is running at the minimum synchronous speed, and if it were not for the speed control means utilized during induction motor operation this would be the lowest speed at which the motor 15 would normally operate.

During synchronous motor operation, the motor 15 may be operated at a plurality of predetermined speeds above the minimum synchronous speed. This may be done by increasing the speed of the prime mover 11 which in turn increases the frequency of the motor terminal voltage, thus increasing the speed of the motor 15. For example, the speed of the motor 15 will increase if the controller arm 55 is moved from its last-mentioned position on contact segments 97 and 99 until it simultaneously engages contacts 71, 105 and 107. This is accomplished by operation of valve 59 through the electromagnetic means 63. The circuit for means 63 may be traced from the positively energized arm 55 through the contact 71, conductor 109, the coil of electromagnet 63, to the negatively energized conductor 93. The throttle-operating mechanism 61 is thus caused to operate the throttle-valve 59 so that more fuel will be admitted to the internal combustion engine 11. Not only is the speed changed by varying the fuel input, but over a range sufficient for proper operation of a ship propulsion system, the torque developed by an internal combustion engine also varies as a function of the fuel input, in other words, the torque is substantially constant for a given fuel injection. Advancing the arm 55 of the controller from contact segment 99 to contact segment 107 and from contact segment 97 to contact segment 105 simultaneously decreases the resistance of both the generator field circuit and the motor field circuit thus increasing the respective field currents. The resulting increase in the field currents increases the value of the pull-out torque of the synchronous motor, thus maintaining the stability of the electric ship propulsion system by maintaining a predetermined ratio of load torque to pull-out torque.

Further increases in speed may be made in the manner hereinabove described by advancing the arm still further in the counter-clockwise direction to increase the field currents simultaneously with the increase in fuel injections, thus maintaining within certain limits, the ratio of the load torque to pull-out torque so that the ship propulsion system will operate safely and efficiently.

If, for any reason, it should be desirable to decrease the speed of the motor, the controller arm is moved towards the "off" position, that is, in a clockwise direction. For example, if the system is operating at a speed obtained when the controller arm 55 is in engagement with contact segments 71, 105 and 107, and it is desired to operate at a speed corresponding to that obtained when the controller arm engages contact segment 83, that is a speed below the synchronous speed of the motor 15, the arm 55 is moved from contact segment 71 in a clockwise direction to the new position. In consequence, the electromagnet 63 is deenergized and so moves the system of levers of the throttle-operating mechanism 61 that the throttle-valve 59 is operated to supply less fuel to the internal combustion engine 11 and thus decreases the speed of the motor to sub-synchronous speed.

The arm 55 also moves from contact segment 105 over the segments 97 and 96, deenergizing the field 25 of the motor 15, thus returning the motor to induction motor operation.

Also, the arm 55 moves from contact segment 107 over segments 99, 95, 87 and 85 to segment 83. The movement of the arm 55 from contact segment 107 to segment 87 has substantially no effect on the speed of the motor but by moving the arm 55 from contact segment 87 to segment 83 a decrease in the field current of generator 13 results because of the increase in resistance in the circuit for field winding 37. Thus, the terminal voltage is reduced causing the motor 15 to run at a lower speed.

Perhaps a better understanding of the speed control during induction motor operation may be obtained by studying a group of motor performance curves and comparing them with a load torque curve as shown in Fig. 2. These curves, while they are characteristic of the ship propulsion system herein specifically described, give only approximate relative values. They are of benefit though when used in conjunction with the brief theory and equations given in the beginning of this specification. The propeller torque curve shown as a load torque curve may be any torque curve that represents torque as a function of speed, provided of course that it differs somewhat from the motor torque curves so that stable operation may be obtained. The motor torque curves shown for a plurality of relative values of motor flux show the effect of varying the terminal voltage of the motor 15 since the flux varies as a function of the terminal voltage. 100% flux represents the motor flux when the motor is operating at substantially synchronous speed and when the internal combustion engine 11 is operating at its minimum speed recommended for stable operation. The lower values of motor flux may be obtained by decreasing the terminal voltage of the motor 15. For example, the motor torque for 20% torque may be obtained when arm 55 of controller 29 is in contact with segment 81. Similarly, the torque curves for 30%, 50% and 100% may be obtained when the arm 55 completes the generator field circuit through contact segments 83, 85 and 87, respectively. The intersections of the motor torque curves with the load torque curve indicate the speeds at which the motor may be operated as an induction motor for various positions of the controller arm.

I do not wish to be restricted to the specific structural details, arrangement of parts or circuit connections herein set forth, as various other modifications thereof may be effected without departing from the spirit and scope of my invention, I desire, therefore, that only such limitations shall be imposed as are indicated in the appended claims.

I claim as my invention:

1. In an electric ship propulsion system in combination with a variable speed prime mover, a synchronous generator driven by the said prime mover, a synchronous alternating current motor having a field winding and a squirrel-cage winding arranged to drive a propeller and adapted to be connected to said generator to operate either as an induction motor or as a synchronous motor, means, comprising a single group of devices, for controlling the speed of said motor, said means including field excitation control means for the said generator, speed control means for the said prime mover and stability control means for the said system, said stability control means being adapted to simultaneously control the excitation of the generator and motor.

2. In an electric system, in combination, an internal combustion engine, a synchronous generator driven by the said engine, a synchronous motor electrically connected to the said generator and provided with an induction motor winding of the squirrel cage type and a field winding, a controller adapted to be successively operated to a plurality of positions for starting and accelerating the said motor, said controller being combined with and adapted to successively cause to operate means for increasing the voltage of said generator in a plurality of successive steps to vary the speed of the motor, means for temporarily overexciting the motor and generator to provide easy transfer from induction motor operation to synchronous motor operation, and means for increasing the speed of the prime mover to thus gradually increase the frequency of the generator to thereby still further increase the speed of the motor.

3. In an electric power system in combination with an internal combustion engine having a minimum safe operating speed, a generator mechanically coupled thereto, the voltage and frequency of which may be varied, a synchronous motor electrically connected to the said generator, and means including means for varying the terminal voltage of said generator, for varying the speed of the said motor below the synchronous speed corresponding to the minimum safe operating speed of the said engine, means for synchronizing the said motor, and means for operating the said motor at a plurality of speeds as a synchronous motor.

4. In a control system, in combination with a variable speed internal combustion engine having a minimum stable operating speed, a synchronous generator mechanically coupled to the said engine, a synchronous motor having a squirrel-cage winding and a field winding electrically connected to the said generator, a controller combined with and adapted to successively, during its range of action, cause the operation of means for starting the said motor as a squirrel-cage induction motor, means for varying the speed of the motor, means for synchronizing the said motor at a minimum stable synchronous speed determined by the minimum operating speed of the said engine, and control means for varying the speed of the said internal combustion engine.

5. In an electric system, in combination with a variable speed prime mover having a minimum stable operating speed, a synchronous generator, having a field winding, mechanically coupled to the said prime mover, a synchronous motor electrically connected to the said generator, means for starting the said motor as an induction motor, means for synchronizing the said motor at a minimum synchronous speed determined by the minimum operating speed of the said prime mover, and control means for varying the speed of the said motor below the minimum synchronous speed, the said control means comprising means for operating the said motor as an induction motor, and means for varying the excitation of the said field winding of the said synchronous generator.

6. An electric ship propulsion system comprising an internal combustion engine, a synchronous generator driven by the said engine, a propeller-driving synchronous motor having an induction motor winding and electrically connected to the said generator, means mechanically and electrically interconnected for controlling the speed and the stability of the system, and means including, generator field control means for varying the speed of the said motor during induction motor operation, means for synchronizing the said synchronous motor, control means for varying the speed of the said engine during synchronous motor operation, and field control means for the motor and the generator to maintain stability, for controlling the speed of the said engine and the excitations of the said generator and the said motor, the said field control means including stability control means, speed control means for induction motor operation, and speed control means for the synchronous motor.

7. In a power system, in combination, with an internal combustion engine having a minimum operating speed, a throttle-operating mechanism adapted to be operated to a plurality of positions to secure a plurality of engine speeds, an alternating-current generator coupled to the said engine, a synchronous motor electrically connected to the said generator, excitation means for the said generator and the said motor of means for starting and operating the said motor as a squirrel-cage induction motor when the said throttle operating mechanism is in position to operate the said engine at its minimum operating speed, means for varying the speed of the said motor during induction motor operation, said means including means for varying the excitation of the said generator, thus varying the terminal voltage of the said motor.

8. In an electric ship propulsion system, in combination, an internal combustion engine having a minimum stable operating speed, a synchronous generator, having a field winding, mechanically connected to the said engine, a synchronous motor having a field winding, an induction motor winding, and a stator winding electrically connected to the said generator, a source of energy for supplying excitation to the field windings of the said generator, and the said motor, means for controlling the speed of the said motor by varying the terminal voltage of the said motor during induction motor operation when the said engine is operating at its minimum stable operating speed, said means including rheostatic means for controlling the excitation of the said generator field winding when the said motor field winding is disconnected from the said source of energy.

9. In an electric ship propulsion system, in combination, a prime mover having a minimum stable operating speed, a generator, having a field winding, mechanically connected to the said prime mover, a propeller-driving synchronous motor having a stator winding electrically connected to the said generator, a field winding, and an induction motor winding, a source of energy for the said generator and the said motor field windings, a throttle for controlling the energy to the said prime mover and thus for controlling the speed of the said motor during synchronous motor operation for speeds above the minimum stable operating speed of the prime mover, a throttle-operating mechanism for operating the said throttle, rheostatic means electrically connected to the said generator field winding and the said source of energy for varying the speed of the said motor during induction motor operation when the prime mover is operating at its minimum stable-operating speed and for maintaining the stability of the electric ship propulsion system when the motor is operating as a synchronous motor, rheostatic means electrically connected to the said motor field winding and the said source of energy for maintaining the stability of the electric ship propulsion system when the motor is operating as a synchronous motor, and a controller cooperatively associated with the said rheostatic means and the said throttle-operating mechanism for starting and operating the said motor as an induction motor when the said prime mover is operating at its minimum operating speed, for controlling the speed of the said motor during induction motor operation, for synchronizing the said motor, for controlling the speed of the said motor during synchronous motor operation, and for maintaining a predetermined sequence of operation.

10. In an electric power system, in combination, an internal combustion engine having a minimum safe operating speed, a generator mechanically coupled thereto, the voltage and frequency of which may be varied, a synchronous motor provided with a primary winding electrically connected to said generator, a field winding, and a damper winding of the squirrel-cage type, means for varying the terminal voltage of the said motor when the said motor field winding is deenergized and the said engine is operating at a predetermined low speed to operate the motor as an induction motor at speeds below the synchronous speed determined by the said low speed of the engine, means for synchronizing the said motor and connecting the motor field winding to a source of unidirectional current to operate the motor as a synchronous motor, and means including stability control means for varying the speed of the motor during synchronous motor operation.

WALTER SCHAELCHLIN.